US012613329B2

(12) United States Patent
Lim

(10) Patent No.: US 12,613,329 B2
(45) Date of Patent: Apr. 28, 2026

(54) ULTRA-WIDE BAND DEVICE AND ULTRA-WIDE BAND RANGING METHOD USING THE SAME

(71) Applicant: HYUNDAI MOBIS CO., LTD., Seoul (KR)

(72) Inventor: Jong Chul Lim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 534 days.

(21) Appl. No.: 18/085,727

(22) Filed: Dec. 21, 2022

(65) Prior Publication Data

US 2023/0333239 A1    Oct. 19, 2023

(30) Foreign Application Priority Data

Apr. 15, 2022    (KR) ........................ 10-2022-0046716

(51) Int. Cl.
*G01S 13/76* (2006.01)
*H04B 1/7163* (2011.01)
*B60R 25/24* (2013.01)

(52) U.S. Cl.
CPC .......... *G01S 13/765* (2013.01); *H04B 1/7163* (2013.01); *B60R 25/245* (2013.01)

(58) Field of Classification Search
CPC ............................. G01S 13/765; H04B 1/7163
See application file for complete search history.

(56) References Cited

U.S. PATENT DOCUMENTS

| | | | |
|---|---|---|---|
| 2007/0024492 A1* | 2/2007 | Takano | G01S 13/878 342/135 |
| 2014/0152496 A1* | 6/2014 | Cho | G01S 19/13 342/357.43 |
| 2022/0099818 A1* | 3/2022 | Werner | G01S 5/0252 |

FOREIGN PATENT DOCUMENTS

DE        112018005200 T5 *    6/2020

* cited by examiner

*Primary Examiner* — Robert W Hodge
*Assistant Examiner* — Helena H Seraydaryan
(74) *Attorney, Agent, or Firm* — NSIP Law

(57) ABSTRACT

Disclosed is an ultra-wide band (UWB) device. The UWB device includes a memory configured to store instructions, a communication system, and processors that execute the instructions to perform ranging through UWB with another UWB device to determine multiple ranging results, and correct the multiple ranging results by adjusting a deviation between the multiple ranging results.

15 Claims, 9 Drawing Sheets

| 124 | 117 | 124 | 120 | 116 | 120 | 116 | 111 | 120 | 114 |
| 121 | 120 | 118 | 118 | 118 | 118 | 109 | 118 | 118 | 121 |
| 114 | 114 | 119 | 121 | 117 | 119 | 118 | 112 | 122 | 118 |
| 100 | 121 | 124 | 118 | 119 | 118 | 121 | 119 | 117 | 114 |
| 119 | 123 | 119 | 119 | 107 | 118 | 120 | 120 | 117 | 120 |
| 121 | 120 | 117 | 102 | 118 | 121 | 122 | 118 | 105 | 120 |
| 120 | 84 | 117 | 117 | 118 | 119 | 124 | 122 | 120 | 121 |
| 121 | 116 | 118 | 113 | 87 | 121 | 109 | 99 | 118 | 119 |
| 118 | 117 | 122 | 115 | 116 | 124 | 119 | 119 | 118 | 114 |
| 118 | 117 | 124 | 119 | 112 | 126 | 119 | 117 | 124 | 117 |

FIG. 7

| 124 | 121 | 114 | 100 | 119 | 121 | 120 | 118 | 118 | 118 |
|-----|-----|-----|-----|-----|-----|-----|-----|-----|-----|
| 117 | 120 | 114 | 121 | 123 | 120 | 84 | 104 | 117 | 117 |
| 124 | 118 | 119 | 124 | 119 | 117 | 117 | 118 | 122 | 124 |
| 120 | 118 | 121 | 118 | 119 | 102 | 117 | 115 | 115 | 119 |
| 116 | 118 | 117 | 119 | 107 | 118 | 118 | 111 | 116 | 112 |
| 120 | 118 | 119 | 118 | 118 | 121 | 119 | 105 | 124 | 126 |
| 116 | 109 | 118 | 121 | 120 | 122 | 124 | 118 | 119 | 119 |
| 111 | 118 | 112 | 119 | 120 | 118 | 122 | 115 | 119 | 117 |
| 120 | 118 | 122 | 117 | 117 | 105 | 120 | 118 | 118 | 124 |
| 114 | 121 | 118 | 114 | 120 | 120 | 121 | 119 | 114 | 117 |

| X CURRENT | Y CURRENT |
|-----------|-----------|
| 121 | 121.0 |
| 115 | 118.5 |
| 118 | 118.3 |
| 113 | 115.6 |
|  | 101.3 |
| 111 | 111.2 |
| 105 | 110.1 |
|  | 104.5 |
| 118 | 111.3 |
| 119 | 115.1 |

ULTRA-WIDE BAND DEVICE AND ULTRA-WIDE BAND RANGING METHOD USING THE SAME

CROSS-REFERENCE TO RELATED APPLICATION

This application claims the benefit under 35 USC § 119(a) of Korean Patent Application No. 10-2022-0046716 filed on Apr. 15, 2022, in the Korean Intellectual Property Office, the entire disclosure of which is incorporated herein by reference for all purposes.

BACKGROUND

1. Field

The present disclosure relates to an ultra-wide band (UWB) device, and an UWB ranging method using the same.

2. Description of Related Art

Technologies such as global positioning system (GPS), Wi-Fi, and Bluetooth are used to provide a local based service (LBS). These technologies have difficulties in precise measurement, but ultra-wide band (UWB; a frequency of 6 GHz to 8 GHz and a bandwidth of 500 MHz or more) has advantages in terms of a wide frequency band, low power communication, and positioning with high accuracy within tens of centimeters.

UWB technology can be used to calculate a distance between subjects by multiplying a signal arrival time between communication subjects by the speed of light using Time of Flight (ToF) technology.

Unlike Wi-Fi and Bluetooth, UWB uses a wide frequency band and may transmit a large amount of information with a high transmission speed using little power.

Positioning using UWB technology has the advantage that an error rate is as low as about 20 centimeters, transmittance through an obstacle is high, and the positioning is not affected by other signals such as Wi-Fi.

However, since UWB is sensitive to a surrounding environment due to frequency characteristics thereof, a large deviation may occur even when distance measurements are continuously performed under the same conditions.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, here is provided ultra-wide band (UWB) device. The UWB device includes a memory configured to store instructions, a communication system, and processors that execute the instructions to perform ranging through UWB with another UWB device to determine multiple ranging results, and correct the multiple ranging results by adjusting a deviation between the multiple ranging results.

The processors may apply an exponential smoothing method to the plurality of ranging results to adjust the deviation between the plurality of ranging results.

The processors may adjust the deviation between the plurality of ranging results according to, $$Y_n = a_n * X_n + (1-a_n) * Y_{n-1}$$

Where $Y_n$ denotes a corrected current ranging result value, $a_n$ denotes a weight value, $X_n$ denotes a current ranging result value before correction, and $Y_{n-1}$ denotes a corrected previous ranging result value.

The communication system may perform data communication with an upper-level controller to transmit the ranging result and receive a localization result from the upper-level controller.

The processors may adjust a weight applied to the exponential smoothing method according to a position of a digital key using the localization result.

The processors may decrease a size of the weight in response to a determination that the digital key is positioned inside a vehicle.

The processors may increase a size of the weight in response to a determination that the digital key is positioned outside the vehicle.

The processors may adjust a size of the weight according to a distance between the digital key and the vehicle.

The processors may adjust a weight applied to the exponential smoothing method according to a ranging round period.

The processors may increase a size of the weight as a ranging round period increases.

The processors may reduce a size of the weight as the ranging round period decreases.

In another general aspect, an ultra-wide band (UWB) ranging method includes performing ranging through UWB with another UWB device to generate a ranging result, and correcting the ranging result by adjusting a deviation between a plurality of ranging results calculated according to the ranging.

The method may include applying an exponential smoothing method to the plurality of ranging results to adjust a deviation between the plurality of ranging results.

The UWB ranging method may further include adjusting the deviation between the plurality of ranging results by applying:

$$Y_n = a_n * X_n + (1-a_n) * Y_{n-1}$$

Where $Y_n$ denotes a corrected current ranging result value, $a_n$ denotes a weight value, $X_n$ denotes a current ranging result value before correction, and $Y_{n-1}$ denotes a previous ranging result value before correction.

The method may include performing, after the performing of the ranging, data communication with an upper-level controller to transmit the ranging result, and receiving a localization result from the upper-level controller.

The correcting of the ranging result may include adjusting a weight applied to the exponential smoothing method according to a position of the digital key using the localization result.

The adjusting of the weight may include reducing a size of the weight in response to a determination that the digital key is positioned inside a vehicle and increasing the size of the weight in response to a determination that the digital key is positioned outside the vehicle.

The adjusting of the weight may include adjusting a size of the weight according to a distance between the digital key and the vehicle.

The correcting of the ranging result may include adjusting the weight applied to the exponential smoothing method according to a ranging round period.

The adjusting of the weight may include increasing a size of the weight as the ranging round period increases and decreasing the size of the weight as the ranging round period decreases.

Other features and aspects will be apparent from the following detailed description, the drawings, and the claims.

BRIEF DESCRIPTION OF THE DRAWINGS

FIGS. 5 to 7 are views for describing a ranging result deviation adjustment process of the processor according to the embodiment.

Figure 1:
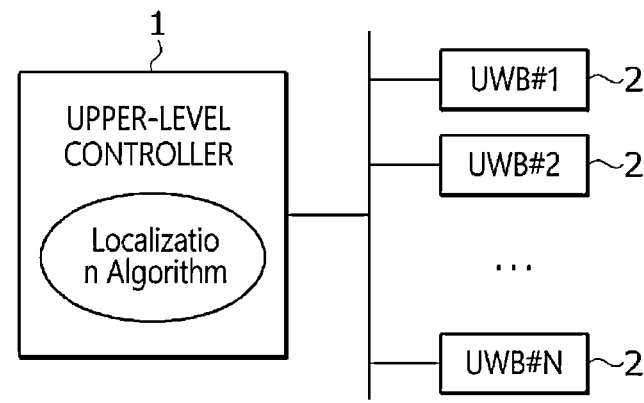
FIG. 1 is a conceptual diagram of an ultra-wide band (UWB) system according to an embodiment.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is adequately disclosed, and a person with ordinary skill in the art can fully understand the scope of the present disclosure. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

The use of the term "up" or "upward" herein is meant to refer to a direction wherein a corresponding vehicle includes wheels on a lower portion of the vehicle compared to a roof of the vehicle in an upper portion of the vehicle.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

FIG. 1 is a conceptual diagram of an ultra-wide band (UWB) system according to an embodiment.

UWB may mean a short-distance high-speed wireless communication technology using a wide frequency band of several GHz or more in a baseband state, a lower spectral density, and a short pulse width (1 nsec to 4 nsec). UWB may mean a band itself to which UWB communication is applied.

The UWB device 2 according to the embodiment may include a fixed terminal or a mobile terminal implemented as a computer device and may communicate with another device and/or server using a wireless or wired communication method. For example, the UWB device 2 may include a smart phone, a mobile phone, a laptop computer, a digital broadcasting terminal, a personal digital assistant (PDA), a portable multimedia player (PMP), a navigation device, a slate personal computer (PC), a table PC, a desktop computer, a digital television (TV), a refrigerator, an artificial intelligence speaker, a wearable device, a projector, a smart key, a digital key, a smart car, a printer, a vehicle console, and control device that controls at least partial function of a vehicle, but the present disclosure is not limited thereto.

In the embodiment, an example of a case in which the UWB device is installed in the digital key or the smart phone and a vehicle will be described.

The UWB device 2 according to the embodiment may perform device-to-device (D2D) communication. The D2D communication refers to a method in which geographically close devices directly communicate without an infrastructure such as a base station. In the D2D communication, the devices may communicate in one-to-one manner, a one-to-many manner, or a many-to-many manner. The D2D communication may use an unlicensed frequency band as in Wi-Fi Direct and Bluetooth. Alternatively, the D2D communication may improve a frequency usage efficiency of a cellular system using a licensed frequency band. The D2D communication is limitedly used as a term referring to object-to-object communication or object intelligence communication. However, the D2D communication in the present embodiment may include both communication between various types of devices equipped with a communication function, such as a smart phone or a personal computer as well as communication between a simple device equipped with a communication function.

In the embodiment, an upper-level controller 1 may determine positions between the plurality of UWB devices using a ranging result value. The upper-level controller 1 may classify the UWB devices 2 into a plurality of nodes and analyze positions of the UWB devices 2 according to a distance relationship between the nodes. The upper-level controller 1 may set the plurality of UWB devices 2 mounted on the vehicle as anchor nodes, set the UWB devices 2 mounted on the digital key as tag nodes, and thus determine a position of each UWB device 2 according to a distance relationship between the anchor nodes and the tag nodes.

Figure 2:
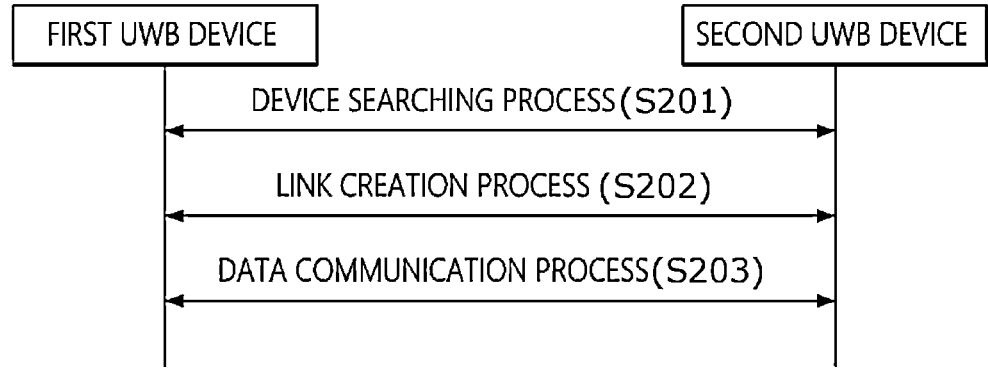
FIG. 2 is a view illustrating a communication process of a plurality of UWB devices.

FIG. 2 is a view illustrating a communication process of a plurality of UWB devices.

A first UWB device and a second UWB device may perform communication through a device searching process, a link creation process, and a data communication process.

In the device searching process, each of the first UWB device and the second UWB device may search for other UWB devices capable of the D2D communication among UWB devices around a user. Therefore, each of the first UWB device and the second UWB device may determine whether to create a link for the D2D communication. For example, the first UWB device may transmit a search signal so that the second WUB device may search for the first UWB device. Further, the first UWB device may receive a searching signal transmitted by the second UWB device and identify that other electronic devices capable of the D2D communication are positioned within a D2D communication range (S201).

In the link creation process, each of the first UWB device and the second UWB device may create a link for data transmission with a UWB device, to which data is to be transmitted, among the UWB devices searched in the device searching process. For example, the first UWB device may create a link for data transmission with the second UWB device searched in the device searching process (S202).

In the data communication process, each of the first UWB device and the second UWB device may transmit or receive data to or from the UWB devices that create the link in the link creation process. For example, the first UWB device may transmit or receive data to or from the second UWB device through the link created in the link creation process (S203).

Various embodiments of the present application relate to medium access control (MAC) based on the above-described D2D communication, and for the MAC, a distance between the UWB devices needs to be measured. In this case, UWB ranging technology may be used to measure a distance between the electronic devices.

Figure 3:
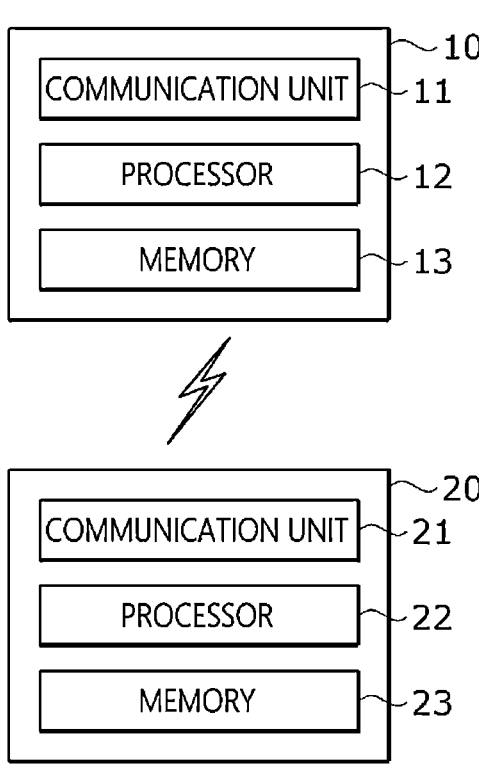
FIG. 3 is a block diagram of the UWB device according to the embodiment.

FIG. 3 is a block diagram of the UWB device 10 according to the embodiment. Referring to FIG. 3, the UWB device 10 according to the embodiment may perform ranging with another UWB device 20 through UWB and UWB and include a communication unit 11 (for example, communication system), at least one processor 12, and a memory 13. Further, the other UWB device 20 may also include a communication unit 21, at least one processor 22, and a memory 23 in which a UWB ranging program is embedded. Communication unit 11 may include, for example, a transceiver configured to transmit and receive communications.

The communication unit 11 may transmit a ranging result by performing data communication with the upper-level controller 1 and receive a localization result from the upper-level controller 1. The communication unit 11 may perform the data communication with the upper-level controller 1 through an L-CAN bus and transmit the ranging result to the upper-level controller 1. Further, the localization result may be received from the upper-level controller 1 through the L-CAN bus.

The processor 12 may perform ranging through the UWB with the other UWB device 20 and measure a distance to the other UWB device 20.

For example, when the digital key stored in the smart phone is used to open or close a door of the vehicle, the vehicle may measure a distance between the smart phone and the vehicle using the plurality of UWB devices 10 (for example, six UWB communication modules) and then estimate a position of the smart phone on the basis of the measurement result. When a distance between the vehicle and the smart phone becomes closer to a predetermined distance or less, the door of the vehicle may be automatically opened so as to improve convenience of a user. The vehicle and the smart phone may use multicast ranging or broadcast ranging.

Figure 4:
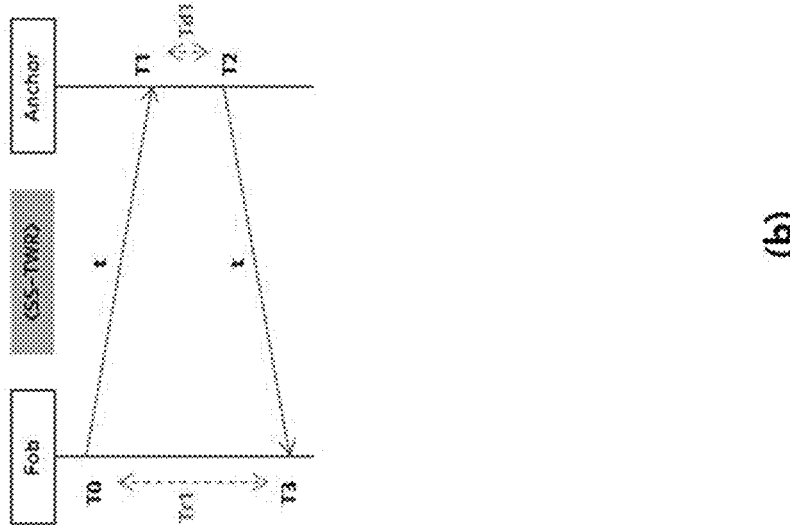
FIG. 4 are views illustrating a ranging process of a processor according to the embodiment.
Figure 4:
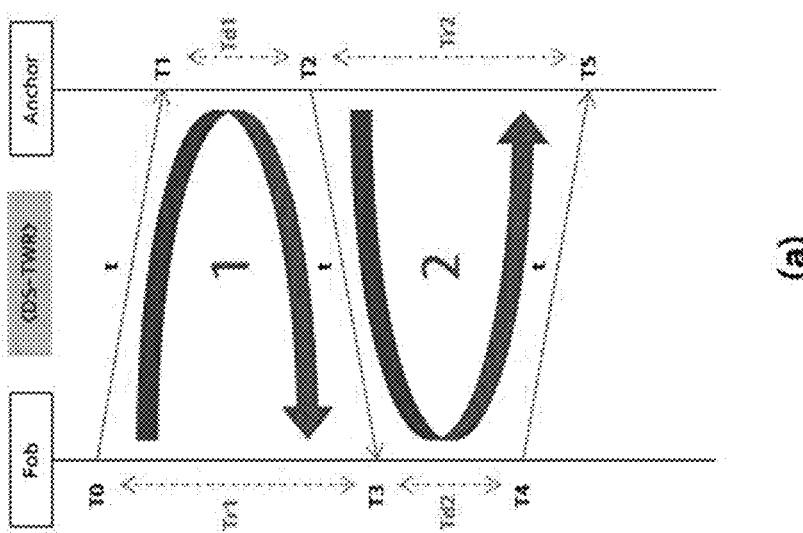

FIG. 4 is a view illustrating a ranging process of a processor according to the embodiment.

FIG. 4 illustrates a two-way ranging (TWR) method such as (a) a double sided TWR (DSTWR) and (b) a single sided TWR (SSTWR).

Ranging refers to an action of measuring a distance between one fob and one anchor, data structure may conform to IEEE802.15.4z standard, and about 200 us may be consumed for transmitting one packet.

In the embodiment, the UWB device 10 may operate as a fob or an anchor. When the UWB device 10 according to the embodiment operates as the fob, the other UWB device 20 may operate as the anchor. Alternatively, when the UWB device 10 according to the embodiment operates as the anchor, the other UWB device 20 may operate as the fob.

A slot may be defined as a time period from a time at which the fob or anchor transmits (or receives) a signal once to a time at which next transmission (or reception) is performed.

A UWB transmission and reception slot of an RSA defense subscriber management key (SMK) system may be designed to be about 2 ms and may be changed according to specifications. The DSTWR method has high power consumption due to a large number of instances of signal transmission and reception, but has excellent accuracy of distance measurement.

First, the fob transmits a poll packet and records a timestamp $T_0$.

Next, the anchor receives the poll packet and records $T_1$.

Next, the anchor consumes a time $T_{d1}$ to receive a signal and generate a response packet, transmits a response message, and records $T_2$.

Next, the fob receives the response message and records $T_3$.

Next, the fob consumes a time $T_{d2}$ to receive the signal and generate a final message.

Next, the fob transmits the final message and records $T_4$, and the anchor receives the final message and records $T_5$.

Further, the processor 12 according to the embodiment may correct a ranging result by adjusting a deviation between a plurality of ranging results.

In this case, the processor 12 may adjust the deviation between the plurality of ranging results by applying an exponential smoothing method to the plurality of ranging results.

For example, the processor 12 may adjust the deviation between the plurality of ranging results according to [Equation 1].

$$Y_n = a_n * X_n + (1 - a_n) * Y_{n-1} \qquad \text{[Equation 1]}$$

In Equation 1, $Y_n$ denotes a corrected current ranging result value, $a_n$ denotes a weight value, $X_n$ denotes a current ranging result value before correction, and $Y_{n-1}$ denotes a corrected previous ranging result value.

Further, the processor 12 may adjust a weight applied to the exponential smoothing method according to a position of the digital key using the localization result.

For example, the processor 12 may reduce the size of the weight when the digital key is positioned inside the vehicle. Alternatively, the processor 12 may increase the size of the weight when the digital key is positioned outside the vehicle. In this case, the processor 12 may adjust the size of the weight according to a distance between the digital key and the vehicle. For example, the processor 12 may further increase the size of the weight as the distance between the digital key and the vehicle becomes larger.

When it is determined on the basis of the localization result received from the upper-level controller that the digital key is positioned inside the vehicle, an error exceeding an allowable range may occur in a ranging result value of the UWB device 10. This is because the vehicle itself acts as an obstacle to the UWB communication, generates a large number of reflected waves, and thus causes a large deviation between ranging results. However, when the digital key actually moves only inside the vehicle, a difference in the ranging result value is not large. Thus, when it is determined on the basis of the localization result received from the upper-level controller that the digital key is positioned inside the vehicle, a weight value a may be set to be smaller than a weight value applied to previous ranging deviation adjustment. For example, in the case in which the weight value a of the previous ranging deviation adjustment is set to 0.5, when the digital key moves only inside the vehicle, the processor 12 may set the weight value a to 0.3.

Alternatively, when it is determined on the basis of the localization of the digital key result received from the upper-level controller that the digital key is positioned outside the vehicle, the processor 12 may determine that a UWB communication environment is relatively good due to a Line Of Sight (LOS) condition and may predict that the deviation between the ranging result value is small. However, since the movement of the digital key outside the vehicle is difficult to predict due to a wide active range, a weight is added to a current value, and thus the current value may be set to be a relatively large value. For example, in the case in which the weight value a of the previous ranging deviation adjustment is set to 0.5, when the digital key moves outside the vehicle, the processor 12 may set the weight value a to 0.7.

Further, the processor 12 may adjust a weight applied to the exponential smoothing method according to a ranging round period.

For example, the processor 12 may increase the size of the weight as the ranging round period becomes longer. Alternatively, the processor 12 may reduce the size of the weight as the ranging round period becomes shorter.

In this case, the processor 12 may adjust the weight according to a difference between a previous ranging round period and a current ranging round period. For example, as the current ranging round period becomes longer as compared to the previous ranging round period, the processor 12 may increase the size of the weight in proportion to a difference value therebetween.

Alternatively, as the current ranging round period becomes shorter as compared to the previous ranging round period, the processor 12 may reduce the size of the weight in proportion to the difference value.

The UWB ranging for the digital key is not terminated after one time but has a strong tracking feature that is continuously performed. That is, there is the ranging round period in which ranging is continuously performed, and this ranging round period may occur differently each time.

For example, when the ranging round period is 100 ms, there is no case in which the ranging result value differs by several tens of centimeters, but when the ranging round period is 10 seconds, the ranging result value may differ by several tens of centimeters to several meters according to an environment and condition.

That is, since a movable distance is limited as the ranging round period becomes shorter, the processor 12 may reduce the size of the weight. For example, when the weight value a applied to the previous ranging deviation adjustment is set to 0.5, and when the ranging round period becomes shorter than the previous ranging round period, the processor may set the weight value a to 0.1.

Further, since a movable distance is not limited as the ranging round period becomes longer, the processor 12 may increase the size of the weight. For example, when the weight value a applied to the previous ranging deviation adjustment is set to 0.5, and when the ranging round period becomes longer than the previous ranging round period, the processor 12 may set the weight value a to 0.9.

The ranging result value corrected by the processor 12 may be transferred to the upper-level controller 1 again and then used for the localization. In this case, the corrected ranging result value can greatly improve accuracy of the localization.

Figure 5:
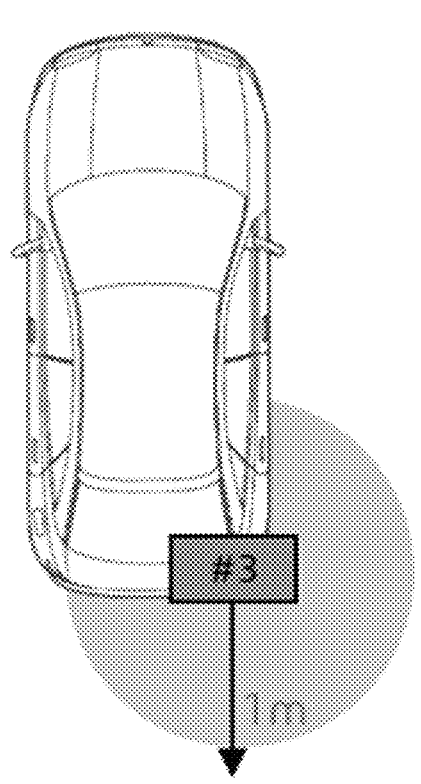

Data in a table specified in FIG. 6 is obtained by measuring a ranging result between the UWB device 10 of the vehicle and the UWB device 10 mounted on the digital key apart from the vehicle by 1 m as illustrated in FIG. 5. The number of measured ranging result values in FIG. 6 is 100, an average value is 117 cm, a maximum value is 126 cm, and a minimum value is 84 cm.

The reason why the average value of the ranging results is calculated as 117 cm is that actual measurement environments such as the embedded thickness of the UWB device 10 mounted on a vehicle made of a material having a high aluminum content, which is called Atacama Copper, a height difference with the UWB device 10 mounted on the digital key, and the like are reflected.

However, even in consideration of the actual measurement environment factors, the fact that a difference between the maximum value and the minimum value is 40 cm or more under the same condition may degrade the reliability of the ranging result value.

In fact, when the ranging result value is examined, singular values less than 100 cm are occurring, and when the singular values are removed, the average value of the ranging result values is 118 cm, the maximum value thereof is 126 cm, and the minimum value thereof is 100 cm. Thus, it may be identified that the deviation is greatly reduced.

In this way, the reliability of the ranging result value can be improved simply by removing the singular values from data group of the ranging result values.

However, since the result is for the ranging result values measured under the same condition, which direction the user moves cannot be predicted in the ranging result value obtained in a real-use environment in which a user moves while carrying the digital key, and thus only the singular values cannot be deleted.

The reason why the singular values are problems is that reliability of the localization result of the digital key is also together reduced in a localization algorithm mainly performed on the basis of the ranging result value.

In the embodiment, when the localization algorithm fails to solve the reduction in the reliability, the UWB device 10 itself may correct the data, but does not delete the data, and smooth the data, thereby ultimately improving localization performance.

FIG. 7 illustrates a result obtained by correcting some of the ranging result values measured in FIG. 6 according to the embodiment, In FIG. 7, for convenience of description, the weight is set to 0.5. However, as described above, the weight value a is a coefficient expressing, as the weight, importance of the current ranging result value and the past ranging result value according to an UWB system and environment. Thus, the weight value a may be set differently according to the localization result and the ranging round period of the upper-level controller.

When 10 pieces of data in a third column in which the deviation of the ranging result value is highest are substituted into [Equation 1] and corrected, Y (current) that is a first correction value is calculated as 121 by applying X (current) as it is because Y (previous) is not present. A second correction value Y (current) is 0.5*116+ 0.5*121=118.5, and a third correction value Y (current) is 0.5*118+0.5*118.5=118.3. In this manner, all the correction values in the third column were obtained and arranged as in the table on a right side. An average value of the uncorrected ranging result values X (current) is 112 cm, a maximum value thereof is 121 cm, and a minimum value thereof is 87 cm. Further, an average value of the corrected ranging result values Y (current) is 112.7 cm, a maximum value thereof is 121 cm, and a minimum value thereof is 101.3 cm. In this way, it may be identified that the average values and the maximum values are almost similar in the results before and after correction, but the minimum value increases, and as a result, the deviation is greatly reduced, and the reliability of the ranging result value increases.

Further, even in an actual use environment in which the digital key moves, when the weight is adjusted according to the localization result and the ranging round period of the upper-level controller, a more reliable result can be obtained.

In this way, when the degree of deviation of the ranging result value is severe, the localization performance of the digital key is adversely affected, and thus self-correction is required to secure the performance of the UWB system.

In the UWB device 10 according to the embodiment, the ranging result value is corrected by applying the exponential smoothing method, and the deviation of the ranging result value can be minimized by actively adjusting the weight according to states of the vehicle and the digital key.

Figure 8:
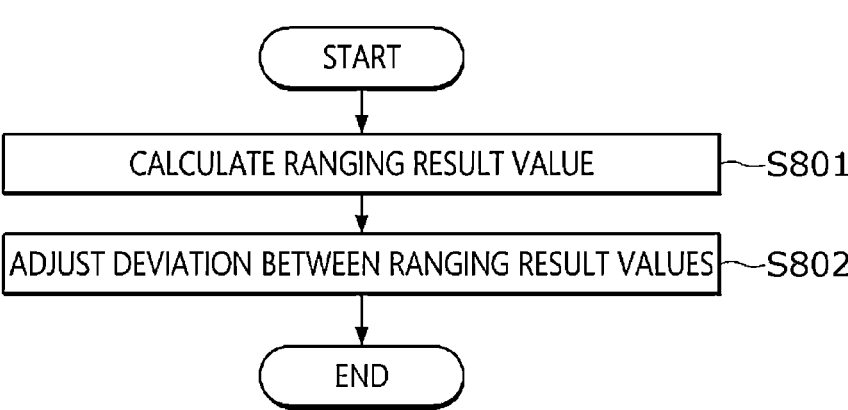
FIGS. 8 to 10 are flowcharts of a UWB ranging method according to the embodiment.

FIG. 8 is a flowchart of a UWB ranging method according to the embodiment.

Referring to FIG. 8, first, the UWB device performs ranging with another UWB device through UWB (S801).

Next, the UWB device corrects the ranging result by adjusting a deviation between a plurality of ranging results calculated according to the ranging. In this case, the processor may adjust the deviation between the plurality of ranging results by applying the exponential smoothing method to the plurality of ranging results (S802).

Figure 9:
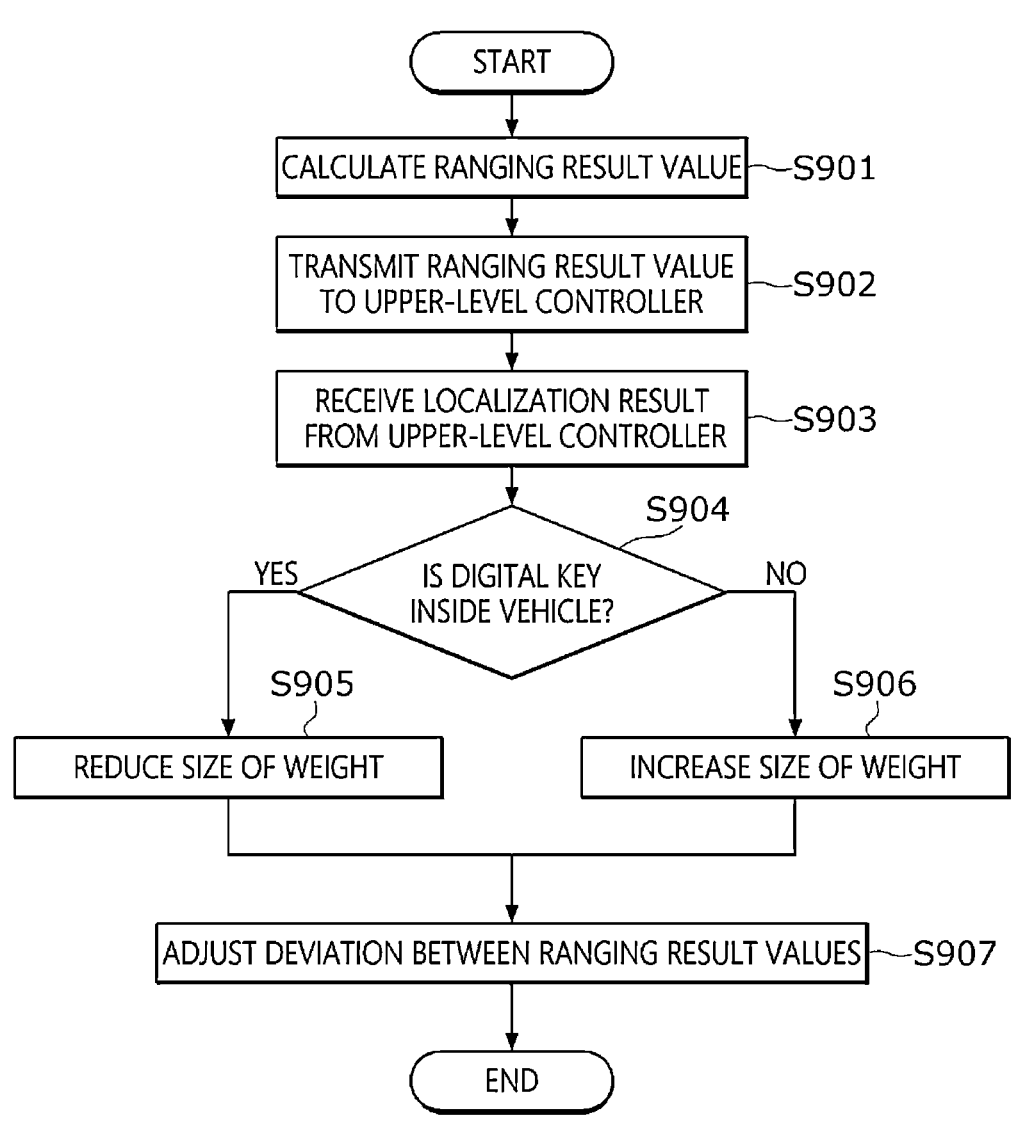

FIG. 9 is a flowchart of a UWB ranging method according to another embodiment.

Referring to FIG. 9, first, the UWB device performs ranging with another UWB device through UWB (S901).

Next, the UWB device performs data communication with the upper-level controller to transmit the ranging result (S902).

Next, the UWB device receives the localization result from the upper-level controller (S903).

Next, the UWB device adjusts a weight applied to the exponential smoothing method according to the position of the digital key using the localization result. In this case, the UWB device reduces the size of the weight when the digital key is positioned inside the vehicle and increases the size of the weight when the digital key is positioned outside the vehicle (S904 to S906).

Next, the UWB device corrects the ranging result by adjusting a deviation between a plurality of ranging results calculated according to the ranging. In this case, the processor may adjust the deviation between the plurality of ranging results by using the exponential smoothing method to which the adjusted weight is applied (S907).

Figure 10:
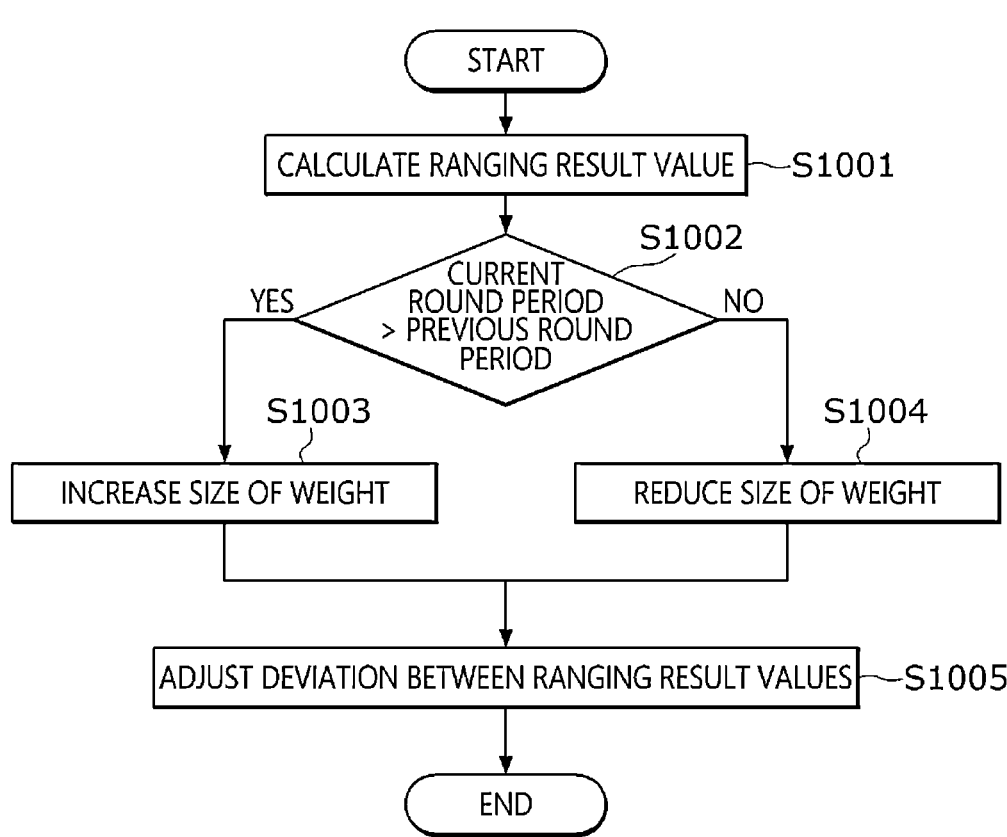

FIG. 10 is a flowchart of a UWB ranging method according to still another embodiment.

Referring to FIG. 10, first, the UWB device performs ranging with another UWB device through UWB (S1001).

Next, the UWB device adjusts a weight applied to the exponential smoothing method according to the ranging round period. In this case, the UWB device compares the current ranging round period with a preceding ranging round period, increase the size of the weight as the ranging round period becomes longer, and reduces the size of the weight as the ranging round period becomes shorter (S1002 to S1004).

Next, the UWB device corrects the ranging result by adjusting the deviation between the plurality of ranging results calculated according to the ranging. In this case, the processor may adjust the deviation between the plurality of ranging results by using the exponential smoothing method to which the adjusted weight is applied (S1005).

The present disclosure provides an ultra-wide band (UWB) device and a UWB ranging method using the same according to the embodiment can minimize a deviation between UWB ranging results, and accordingly provide a highly reliable ranging result. The present disclosure provides these advantages in contrast to systems such as GPS, Wi-Fi, and Bluetooth.

GPS and mobile communication network-based position tracking technology may have an error range of 5 to 50 m and an error range of 50 m to 200 m, respectively, and in the case of GPS, it may be difficult for a signal from a satellite to reach among a concrete jungle of buildings in a city.

In the case of Wi-Fi, location tracking may be performed at low cost, but since a frequency band used is narrow, channel division may be limited when the number of position tracking targets increases. Further, a mobile terminal may be disconnected from a fixed Wi-Fi access point (AP).

With Bluetooth, a plurality of sensors may be arranged at low cost, but a communication latency is high, and thus Bluetooth is not suitable for tracing positions in real time in a dynamic environment.

The present disclosure provides a ultra-wide band (UWB) device which can minimize a deviation between UWB ranging results, and an UWB ranging method using the same.

The present disclosure also provides a UWB device which can provide reliable ranging results, and a UWB ranging method using the same.

Various embodiments of the present disclosure do not list all available combinations but are for describing a representative aspect of the present disclosure, and descriptions of various embodiments may be applied independently or may be applied through a combination of two or more.

Moreover, various embodiments of the present disclosure may be implemented with hardware, firmware, software, or a combination thereof. In a case where various embodiments of the present disclosure are implemented with hardware, various embodiments of the present disclosure may be implemented with one or more application specific integrated circuits (ASICs), digital signal processors (DSPs), digital signal processing devices (DSPDs), programmable logic devices (PLDs), field programmable gate arrays (FP-GAs), general processors, controllers, microcontrollers, or microprocessors.

The scope of the present disclosure may include software or machine-executable instructions (for example, an operation system (OS), applications, firmware, programs, etc.), which enable operations of a method according to various embodiments to be executed in a device or a computer, and a non-transitory computer-readable medium capable of being executed in a device or a computer each storing the software or the instructions.

The term "~unit" used in the present embodiment refers to software or hardware components such as a field-programmable gate array (FPGA) or an application specific integrated circuit (ASIC), and "~unit" performs certain roles. However, "~unit" is not limited to the software or the hardware. "~unit" may be present in an addressable storage medium or may refresh one or more processors. Thus, as an example, "~unit" includes components such as software components, object-oriented software components, class components, and task components and may include processes, functions, properties, procedures, sub-routines, segments of a program code, drivers, firmwares, microcodes, circuits, data, database, data structures, tables, arrays, and variables. Functions provided in the components and "~unit" may be combined into a smaller number of components and "~units" or may be further separated into additional components and "~units". In addition, the components and "~units" may be implemented to reproduce one or more central processing units (CPUs) in a device or a security multimedia card.

A number of embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An ultra-wide band (UWB) device, the UWB device comprising:
a memory configured to store one or more instructions;
a communication system; and
one or more processors configured to execute the one or more instructions to:
perform ranging through UWB with another UWB device to determine a plurality of ranging results; and
correct the plurality of ranging results by adjusting a deviation between the plurality of ranging results,
wherein the one or more processors are further configured:
to apply an exponential smoothing method to the plurality of ranging results to adjust the deviation between the plurality of ranging results, and
to adjust the deviation between the plurality of ranging results according to:

$$Y_n = a_n * X_n + (1 - a_n) * Y_{n-1},$$

wherein $Y_n$ denotes a corrected current ranging result value, $a_n$ denotes a weight value, $X_n$ denotes a current ranging result value before correction, and $Y_{n-1}$ denotes a previous ranging result value before correction.

2. The UWB device of claim 1, wherein the communication system is configured to perform data communication with an upper-level controller to transmit the ranging result and receive a localization result from the upper-level controller.

3. The UWB device of claim 2, wherein the one or more processors are further configured to adjust a weight applied to the exponential smoothing method according to a position of a digital key using a localization result received from the upper-level controller.

4. The UWB device of claim 3, wherein the one or more processors are further configured to decrease a size of the weight in response to a determination that the digital key is positioned inside a vehicle.

5. The UWB device of claim 4, wherein the one or more processors are further configured to increase a size of the weight in response to a determination that the digital key is positioned outside the vehicle.

6. The UWB device of claim 4, wherein the one or more processors are further configured to adjust a size of the weight according to a distance between the digital key and the vehicle.

7. The UWB device of claim 1, wherein the one or more processors are further configured to adjust a weight applied to the exponential smoothing method according to a ranging round period.

8. The UWB device of claim 7, wherein the one or more processors are further configured to increase a size of the weight as a ranging round period increases.

9. The UWB device of claim 7, wherein the one or more processors are further configured to decrease a size of the weight as the ranging round period decreases.

10. An ultra-wide band (UWB) ranging method comprising:
performing ranging through UWB with another UWB device to generate a ranging result;

correcting the ranging result by adjusting a deviation between a plurality of ranging results calculated according to the ranging;

applying an exponential smoothing method to the plurality of ranging results to adjust a deviation between the plurality of ranging results;

performing, after the performing of the ranging, data communication with an upper-level controller to transmit the ranging result; and receiving a localization result from the upper level controller, wherein the correcting of the ranging result includes adjusting a weight applied to the exponential smoothing method according to a position of the digital key using the localization result.

11. The UWB ranging method of claim 10, further comprising:

adjusting the deviation between the plurality of ranging results by applying:

$$Y_n = a_n * X_n + (1 - a_n) * Y_{n-1}$$

wherein $Y_n$ denotes a corrected current ranging result value, $a_n$ denotes a weight value, $X_n$ denotes a current ranging result value before correction, and $Y_{n-1}$ denotes a previous ranging result value before correction.

12. The UWB ranging method of claim 10, wherein the adjusting of the weight includes:

reducing a size of the weight in response to a determination that the digital key is positioned inside a vehicle; and increasing the size of the weight in response to a determination that the digital key is positioned outside the vehicle.

13. The UWB ranging method of claim 12, wherein the adjusting of the weight includes adjusting a size of the weight according to a distance between the digital key and the vehicle.

14. The UWB ranging method of claim 10, wherein the correcting of the ranging result includes adjusting the weight applied to the exponential smoothing method according to a ranging round period.

15. The UWB ranging method of claim 14, wherein the adjusting of the weight includes:

increasing a size of the weight as the ranging round period increases; and decreasing the size of the weight as the ranging round period decreases.

* * * * *